Oct. 19, 1937.   J. C. NELSON   2,096,683
APPARATUS FOR WASHING CLOTHES
Original Filed Aug. 21, 1933   2 Sheets-Sheet 1

WITNESS

INVENTOR
BY
ATTORNEYS

Oct. 19, 1937.   J. C. NELSON   2,096,683
APPARATUS FOR WASHING CLOTHES
Original Filed Aug. 21, 1933   2 Sheets-Sheet 2
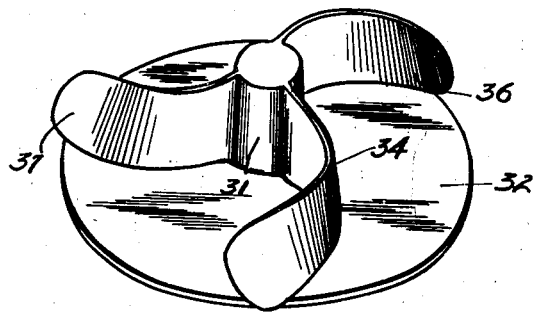
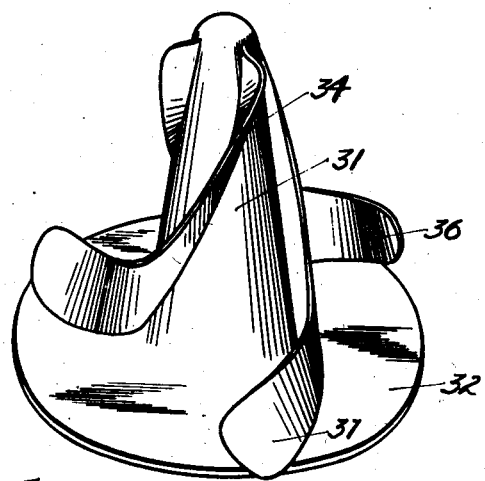
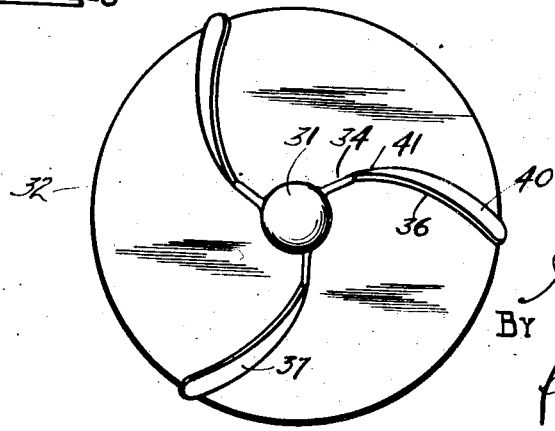
WITNESS
H. L. Meade
INVENTOR
Jabry C. Nelson
BY
ATTORNEYS Patented Oct. 19, 1937

2,096,683

UNITED STATES PATENT OFFICE 2,096,683

APPARATUS FOR WASHING CLOTHES

Jabez C. Nelson, Syracuse, N. Y., assignor to Easy Washing Machine Corporation, Syracuse, N. Y., a corporation of Delaware Application August 21, 1933, Serial No. 686,172
Renewed July 24, 1936

11 Claims. (Cl. 68—15)

This invention relates to new and useful improvements in apparatus for washing clothes, and reference is hereby made to my Patent No. 1,923,580, issued August 22, 1933, upon Method and apparatus for washing clothes.

An object of my invention is to provide an efficient agitator or dolly of the general type described in the above-mentioned copending application, adapted to circulate the contents of the vat in one general direction around the vat.

A further object of my invention is to provide an agitator having blades effective from substantially the bottom of the vat to the normal surface level of cleansing fluid and having a disk at the base thereof upon which the blades are configurated so as to circulate the contents of the vat in one general direction around the vat whereby thorough agitation and circulation of the clothes is secured.

Other objects and advantages will appear from the following description, taken in connection with the accompanying drawings, in which:—

Figure 3 is a perspective view of a modified form of my dolly.

Figure 4 is a perspective view of another modified form of my dolly.

Figure 5 is a plan view of still another modified form of my dolly.

Figure 1:
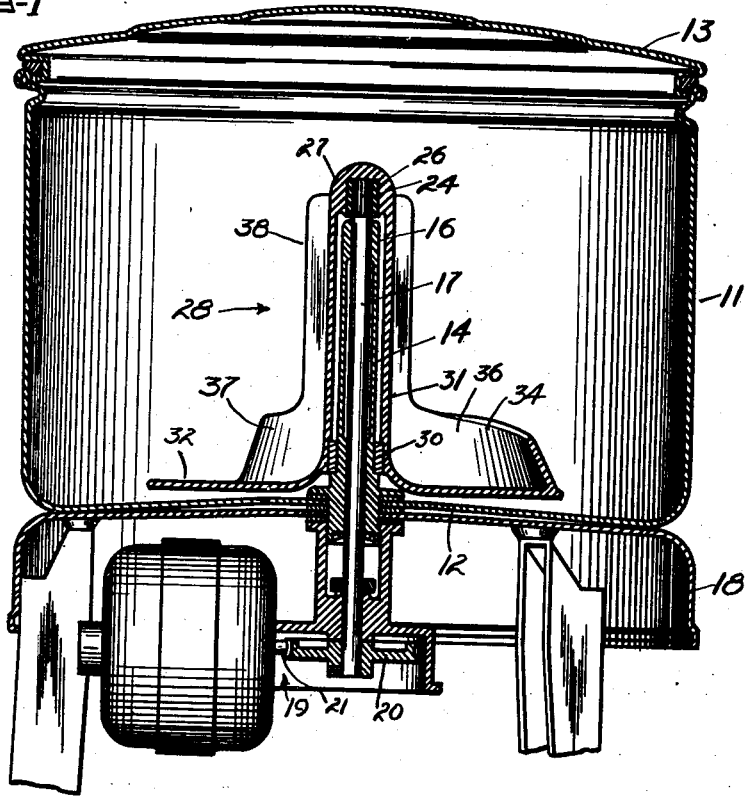
Figure 1 is a cross-sectional view showing my novel dolly in a washing vat.

The dolly of my invention may be mounted in any suitable vat or tub such as illustrated in the drawings, having side walls 11, a bottom 12 and a cover 13. The bottom of the vat at substantially its central portion is provided with an opening for the reception of one end of a flanged upstanding sleeve 14 secured to the bottom 12 of the vat in any suitable water-tight manner. This sleeve at its upper end, is provided with a portion 16 of reduced internal diameter constituting an upper bearing for an oscillatable dolly shaft 17 which extends upwardly from a point without the vat to a point above the bearing 16.

Below the bottom of the vat 12 and partially enclosed by an apron 18 depending from the bottom of the vat 12, is an operating mechanism for the dolly, generally indicated by the numeral 19. The operating mechanism may be any usual and well-known means for oscillating the dolly shaft through a desirable arc as, for instance, two hundred degrees more or less, and there is here shown a gear 20 mounted on the shaft for rotation therewith and adapted to be driven in reverse directions by a segmental gear or rack 21 reciprocated by any suitable mechanism well-known in the art to which this invention applies.

The dolly shaft 17 projects above the bearing 16 and is formed at its upper end with lengthwise splines or grooves 24 for interengagement with corresponding splines or grooves on a bearing member 26 permanently secured within the upper closed end 27 of the dolly, generally indicated by the numeral 28. As shown in the drawings, the dolly has a central hollow bore for the reception of, concentric therewith, the shaft 17 and the sleeve 14. At the base of the dolly and located in the central hollow bore is a lower bearing 30 which is fitted to the dolly and rotates with respect to the sleeve 16. In this manner, a driving connection and support for the dolly is provided by means of the dolly shaft itself and the dolly is guided by the upper and lower guide bearings 16 and 30.

The dolly itself comprises preferably a substantially cylindrical upstanding post or stem 31 which rises substantially from the bottom of the vat to a point normally projecting some distance above the water level so that leakage of cleansing fluid along the shaft 17 is prevented. The post portion 31 terminates at its base in a substantially flat disk 32 located in close proximity to the bottom of the vat 12 and adapted to oscillate in a plane parallel with the bottom of the vat.

A plurality of blades 34, preferably three in number, extend outwardly from the cylindrical post portion from substantially the normal surface level of cleansing fluid, down to the base where they extend outwardly substantially to the circumference of the disk 32 from which they rise upwardly a substantial distance in order to exert an effective action in agitating and circulating the clothes. In order to distinguish the surfaces of the blades designated, I have indicated the surface which I have termed the leading surface, by the numeral 36 and the surface which I have termed the following surface, by the numeral 37.

Preferably the blades extend radially from the post portion, as indicated at 38, and extend downwardly to merge with the blade surfaces on the disk which are curved around the surface of the disk, as indicated at 39, and inclined with respect thereto, preferably increasing in inclination toward the circumference of the disk. Thus, in each blade, the surface 36 which I have termed the leading surface, is curved around the disk and inclined with respect thereto in the same direction so that upon oscillation of the agitator, by reason of the curvature and inclination, the leading surface exerts a much greater and more positive action on the contents of the vat than the following surface 37. When the agitator rotates in a clockwise direction, the contents of the vat are picked up and hurled around the vat and upon reversal, the blades, to a certain extent, merely slide through the cleansing fluid causing but a slight reversal or circulation of the contents of the vat in the counterclockwise direction, and tend to throw the clothes outwardly toward the sides of the vat, with the result that the clothes are thoroughly agitated and tend to circulate in predominantly one direction around the vat.

In Figure 3, I have indicated an agitator which is of the same general construction as that described above, but in which the large upstanding post has been omitted, the post 31 merely extending the height of the blades 34 on the disk. The blades as in the dolly above described, rise a substantial distance above the surface of the disk so as to exert a substantial effect on the contents of the vat, and curve around and incline with respect to the disk as before.

Figure 2:
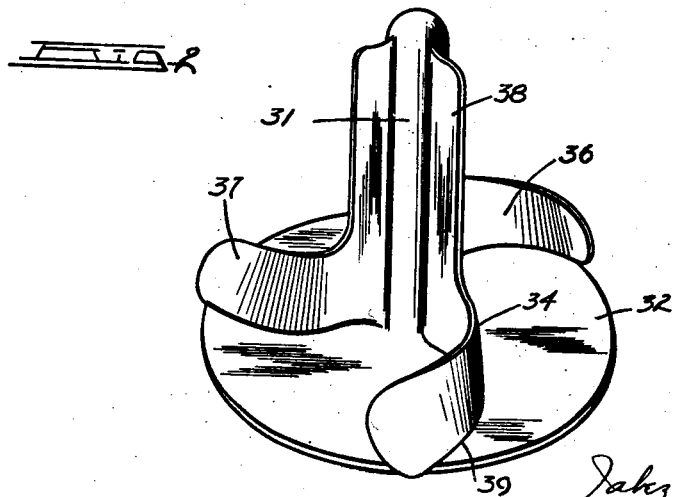
Figure 2 is a perspective view of my dolly.

In Figure 4, I have indicated a dolly similar to that described in connection with Figures 1 and 2 in which the post portion 31 is slightly cone-shaped and the blades 34 extend from the normal surface level of the cleansing fluid, incline with respect to the surface of the cone in the same general direction, and curve downwardly and around the surface with preferably increasing inclination, and merge with the curved and inclined blades on the disk.

The agitator shown in Figure 5 is similar to that shown in Figure 4 with the exception that the blades 34 are merely inclined with respect to the post which, although it may be cone-shaped, has been shown in the drawings as being substantially cylindrical. The blades on the disk, in order that the blades extending downwardly on the post may merge smoothly therewith, gradually decrease in inclination from the outer circumference as at the point 40 and at the point 41 where they merge with the downwardly extending blades on the cone, are substantially vertical with respect to the surface of the disk.

Although I have shown and described various forms of my novel dolly, it will be apparent that each is adapted to violently agitate the contents of the vat and circulate them in one general circulatory direction around the vat, and although I have shown specific forms of my invention, I do not wish to restrict myself to the details of construction, as various changes and modifications may be readily made, without departing from the scope thereof as set forth in the appended claims.

I claim:

1. In a device of the class described, a vat having a normal surface level of cleansing fluid, an oscillatable agitator mounted in said vat, said agitator comprising an upstanding central post, a disk at the botom of said central post and a plurality of generally L-shaped blades, said blades extending along said post from the normal surface level of cleansing fluid and outwardly on the disk substantially to the circumference thereof, said blades being normal to the surface of said post and inclined with respect to the surface of said disk, and means for oscillating said agitator.

2. In a device of the class described, a vat having a normal surface level of cleansing fluid, an oscillatable agitator mounted in said vat, said agitator comprising an upstanding central post, a disk at the bottom of said central post and a plurality of blades, said blades extending along said post from the normal surface level of cleansing fluid and outwardly on the disk substantially to the circumference thereof, said blades being normal to the surface of said post and curved and inclined with respect to the surface of said disk, and means for oscillating said agitator.

3. In a device of the class described, a vat having a normal surface level of cleansing fluid, an oscillatable agitator mounted in said vat, said agitator comprising an upstanding central post, a disk at the bottom of said central post and a plurality of blades, said blades extending along said post from the normal surface level of cleansing fluid and outwardly on the disk substantially to the circumference thereof, said blades being inclined with respect to the post and curved and inclined with respect to the disk, and means for oscillating said agitator.

4. In a device of the class described, a vat having a normal surface level of cleansing fluid, an oscillatable agitator mounted in said vat, said agitator comprising an upstanding central post, a disk at the bottom of said central post and a plurality of blades, said blades extending from the normal surface level of cleansing fluid and outwardly on the disk substantially to the circumference thereof, said blades being inclined and curved in the same direction with respect to the post and the disk, and means for oscillating said agitator.

5. In a device of the class described, a vat having a normal surface level of cleansing fluid, an oscillatable agitator mounted in said vat, said agitator comprising a cone-shaped central portion, a disk at the bottom of said central portion and a plurality of blades extending from the normal surface level of cleansing fluid and outwardly on the disk substantially to the circumference thereof, said blades being inclined with respect to the central cone-shaped portion and the disk in the same direction, and means for oscillating said agitator.

6. In a device of the class described, a vat having a normal surface level of cleansing fluid, an oscillatable agitator mounted in said vat, said agitator comprising a cone-shaped central portion, a disk at the bottom of said central portion and a plurality of blades extending from the normal surface level of cleansing fluid and outwardly on the disk substantially to the circumference thereof, said blades being curved and inclined with respect to the central cone-shaped portion and the disk in the same direction, and means for oscillating said agitator.

7. In a washing machine, a vat having a normal surface level of cleansing fluid, an oscillatable agitator mounted in said vat, said agitator comprising an upstanding central post extending above the normal surface level of cleansing fluid, a disk at the bottom of said post, and a plurality of blades extending outwardly along said post from the normal surface level of cleansing fluid downwardly to join said disk, and outwardly and upwardly on the surface of said disk substantially to the circumference thereof, each blade being similarly inclined with respect to said post and said disk and being curved throughout its length to form a continuous warped surface, and means for oscillating said agitator.

8. In a machine for washing clothes, a vat for containing a washing fluid and the clothes to be washed, an oscillatable agitator mounted in such vat, means for oscillating said agitator, said agitator comprising a substantially disk shaped member and a plurality of blades mounted on said disk shaped member, said blades projecting upwardly from the surface of the disk and extending outwardly from approximately the center thereof substantially to the periphery of the disk and curving around the disk in the same direction and being inclined with respect to a normal to the disk whereby when the agitator is oscillated the clothes and washing fluid are circulated in predominantly one direction around the vat.

9. In a machine for washing clothes, a vat for containing washing fluid and the clothes to be washed, an oscillatable agitator mounted in said vat, means for oscillating said agitator, said agitator comprising a substantially disk-shaped member forming a base for the agitator and a plurality of blades extending outwardly from near the center of said disk to substantially the periphery thereof, each of said blades being curved on the disk in the same direction in a manner such that the outer ends of the blades are advanced around the disk beyond the inner ends and each of said blades being relatively thin and meeting the disk at an acute angle whereby to form well defined pockets between the disk and the blade surfaces.

10. In a machine for washing clothes, a vat for containing washing fluid and the clothes to be washed, an oscillatable agitator mounted in said vat, means for oscillating said agitator, said agitator comprising a substantially disk-shaped member forming a base for the agitator and a plurality of blades extending outwardly from near the center of said disk to substantially the periphery thereof, each of said blades being curved on the disk in the same direction in a manner such that the outer ends of the blades are advanced around the disk beyond the inner ends so as to define leading blade surfaces and following blade surfaces, and each of said blades being relatively thin and meeting the disk at an acuate angle on the leading side of the blade, whereby to form well defined pockets on said leading sides of the blades adapted to exert a substantial propelling effect on the cleansing fluid and clothes when the agitator is rotated in the direction in which the blades advance so as to make the leading surfaces effective.

11. In a machine for washing clothes, a vat for containing washing fluid and the clothes to be washed, an oscillatable agitator mounted in said vat, means for oscillating said agitator, said agitator comprising a plurality of blades and a central member to which the blades are attached and outward from which they extend, said blades having their principal dimension in the direction of their lower edges and said lower edges being closely adjacent the bottom of the vat throughout their length, each of said blades being curved in horizontal cross section in a manner such that the outer ends of the blades are advanced around the vat from the inner ends so as to define leading blade surfaces and following blade surfaces, and each of said blades being relatively thin and extending upward with respect to the bottom of the vat at an acute angle on the leading sides of the blades whereby the blades cause the clothes and washing fluid to circulate in one resultant circulatory direction around the vat.

JABEZ C. NELSON.